United States Patent
Nascetti et al.

(10) Patent No.: US 6,839,407 B2
(45) Date of Patent: Jan. 4, 2005

(54) ARRANGEMENT OF SENSOR ELEMENTS

(75) Inventors: Augusto Nascetti, Aachen (DE); Michael Overdick, Langerwehe (DE)

(73) Assignee: Koninklijke Philips Electronics N.V., Eindhoven (NL)

(*) Notice: Subject to any disclaimer, the term of this patent is extended or adjusted under 35 U.S.C. 154(b) by 70 days.

(21) Appl. No.: 10/295,784

(22) Filed: Nov. 15, 2002

(65) Prior Publication Data

US 2003/0095629 A1 May 22, 2003

(30) Foreign Application Priority Data

Nov. 17, 2001 (DE) .......................................... 101 56 629

(51) Int. Cl.[7] .................................................. H05G 1/64
(52) U.S. Cl. .................... 378/98.8; 378/19; 250/370.09; 348/310
(58) Field of Search ........................ 378/19, 98.8, 98.7; 250/208.1, 214 R, 214.1, 370.08, 370.09; 348/302, 304, 307, 308, 310

(56) References Cited

U.S. PATENT DOCUMENTS 6,198,791 B1 * 3/2001 He et al. ...................... 378/19
6,567,495 B2 * 5/2003 McGrath et al. .............. 378/19

FOREIGN PATENT DOCUMENTS

EP          1 089 555 A1      4/2001

* cited by examiner

Primary Examiner—Craig E. Church
Assistant Examiner—Jurie Yun

(57) ABSTRACT

The invention relates to an arrangement of sensor elements in which the sensor elements are arranged to detect electromagnetic radiation, such as X-rays or light, and to generate in response thereto a charge signal which corresponds to the radiation intensity. Furthermore, a sensor element includes means which enable determination of the incident radiation dose. The sensor elements in the arrangement form groups so that the outputs of all sensor elements of a group are coupled and the sensor elements of a group are preferably arranged so as to neighbor one another. This on the one hand enables determination of the dose in these zones while on the other hand images of lower resolution can be formed simply by combining output signals of a plurality of sensor elements. An arrangement of this kind can be used, for example, in an X-ray diagnostic device or in an optical image acquisition system.

20 Claims, 3 Drawing Sheets

ARRANGEMENT OF SENSOR ELEMENTS

BACKGROUND

The invention relates to an arrangement of sensor elements which is used, for example, for X-ray imaging in X-ray diagnostic systems. The sensor elements are constructed in such a manner that the incident radiation dose can be measured. The sensor elements also form groups so that on the one hand a dose measurement can be performed in large zones and on the other hand the output signals of a plurality of neighboring sensor elements can be combined.

An arrangement of sensor elements is known, for example, from German Offenlegungsschrift EP1089555A1. The sensor elements are arranged in columns and rows and grouped in regions of neighboring sensor elements in such a manner that the outputs of all sensor elements are linked to a data lead. All regions can be read out in parallel, each sensor element or small groups of sensor elements in each region being simultaneously driven.

SUMMARY OF THE INVENTION

It is an object of the present invention to provide an arrangement of sensor elements which enables simple determination of the radiation dose.

This object is achieved by means of an arrangement of sensor elements in which at least one sensor element includes at least one sensor, at least one output, at least one control input and at least one switching unit, in which the sensor element can be activated so that a signal generated by the sensor is present on the output in the activated state, in which the switching unit is coupled to the sensor, to the output and to the control input and is arranged to compare a signal pattern present on the control input with at least one activation pattern and to activate the sensor element in the case of correspondence between the signal pattern present and the activation pattern, in which the sensor element includes at least one means which is arranged to enable a charge flow between the sensor and the output in the non-activated state of the sensor element, in which the arrangement includes at least one group of sensor elements which is configured in such a manner that at least one output of each of these sensor elements is coupled to a group output, and in which three sensor elements in at least one group span a geometrical plane.

The arrangement in accordance with the invention is characterized by sensor elements which are arranged to detect, for example, electromagnetic radiation such as light or X-rays by means of a sensor. When such radiation is incident on a sensor element, the sensor of the relevant sensor element produces a charge signal which corresponds to the radiation intensity and can be output via at least one output of the sensor element. An output of a sensor element is typically coupled to a signal processing component which is not described in detail herein and which further processes the charge signal present on the output of the sensor element. Preferably, the charge signal formed in the sensor should be present on the output at selected instants only. To this end, a sensor element is provided with a switching unit which is coupled to the sensor, to the output and to a control input of the sensor element. The switching unit serves to activate the sensor element when given control signals or control signal patterns are present on the control input.

The sensor element also includes means for enabling a charge flow between the sensor and the output, that is, between the components which are coupled in the active state. This charge flow should be possible whenever the sensor element is not activated, that is, when the sensor is not directly coupled to the output and the charge signal is not present on the output. Such a charge flow may occur, for example, when radiation is incident on the sensor and the charge signal is built up in the sensor. In other words, these means should enable a charge flow between the sensor and the output as imposed by the building up of the charge signal. When this charge flow is measured over a given period of time by means of a unit which is not described in detail herein, the radiation dose incident on the sensor of the sensor element can be determined in an extremely simple and efficient manner, that is, even during the irradiation.

The arrangement in accordance with the invention also includes at least one group of sensor elements. A first characteristic of such a group is that at least three sensor elements of the groups span a geometrical plane. This means that the sensor elements of the arrangement which belong to one group may be multidimensionally located at random. A second characteristic of at least one group is that at least one output of each sensor element of a group is coupled to a common group output whereto usually a unit for the further processing of the charge signals of the individual sensor elements is connected. During a reading out of the arrangement, the sensor elements of a group are, for example, successively activated so that the charge signals of the sensor elements of a group are successively presented on the group output for further processing. The necessity of coupling each sensor element to a respective unit for signal processing is thus eliminated. The combination of the two above characteristics of a group enables the radiation dose which is incident on the sensors of all sensor elements of a group to be measured simultaneously. This offers the advantage that for the accuracy of determination of the overall dose incident on the arrangement it suffices to subdivide the arrangement into zones and to determine the dose as the sum of the doses of the individual zones instead of determining the overall dose on the basis of the sum of the doses incident on each individual sensor element.

A further embodiment of the invention is disclosed wherein an arrangement in accordance with the invention is to be manufactured by means of known technologies, it is particularly advantageous for the design of the switching unit of the sensor elements to proportion the parasitic capacitances of a semiconductor switch (which parasitic capacitances are normally considered to be a great nuisance) deliberately in such a manner that they can be used to achieve an adequate charge flow. When a charge signal is built up during the irradiation of the sensor element, the charge flow then occurring can be considered to be a displacement current. Alternatively, or at the same time, additional capacitances can be provided, for example, parallel to a switch. The application of such capacitances is dealt with in more detail in the description of the embodiments.

The radiation dose incident on the arrangement in accordance with the invention can be determined by first determining the respective doses of the individual groups and by subsequently calculating the overall dose by summing said group doses. When the sensor elements of each group form a geometrically coherent zone because they directly neighbor one another as disclosed below, the overall arrangement is subdivided into coherent instead of fragmented zones. This is particularly advantageous because a subdivision into coherent zones enables simple determination of the location-dependency of the dose within the entire arrangement. Furthermore, if all groups comprise the same number of sensor elements, the arrangement is subdivided into regular zones. In the case of homogeneous irradiation of the arrangement, all zones are then irradiated by the same dose. Such a subdivision forms the basis for a simple, fast and adequately exact determination of the dose of the entire arrangement.

When the arrangement includes a plurality of groups and the relevant group output is connected to a respective signal-processing unit, all groups can advantageously be read out in parallel in that, for example, a sensor element is activated simultaneously in all groups. This can be simply achieved when the sensor elements which should be simultaneously activatable have the same activation pattern and at least one control input of each of these sensor elements is coupled, for example, to a common control lead. When this activation pattern is applied to the control lead, the sensor elements coupled thereto are activated.

The use of a control unit enables a flexible implementation of the read-out operations for the arrangement in accordance with the invention. When the arrangement is used in an image-forming system, a customary read-out operation is characterized by the sequential activation and reading out of all sensor elements of a group. Each pixel then corresponds to the signal read out from a sensor element. If the output image is to have, for example, a lower resolution, a plurality of sensor elements can be simultaneously activated within a group instead of only one sensor element, so that a combination signal, consisting of the signals present on the outputs of the respective activated sensor elements, is present on the group output. This combination signal can then be associated directly with a pixel of the output image. It is not necessary to read out every sensor element of the arrangement and to determine a pixel from the individual signals of the respective sensor elements in a downstream data processing unit. Because the combination signal is formed by direct averaging of the individual signals, the advantage of a lower noise level is achieved. Furthermore, it is also possible to abstain from activating any sensor element during a read-out operation when, for example, the signal of this sensor element is not required for forming the output image.

Another embodiment in conformity with principles of the present invention includes a read-out amplifier coupled to each group output. This enables simultaneous amplification of the signals present on the respective group outputs during a read-out operation of the arrangement, thus preparing these signals for further processing. Yet another embodiment applying principles of the present invention the read-out amplifier is used in a further function so as to determine the radiation dose incident on the relevant group on the basis of the charge flow, the dose can be determined for all groups simultaneously and hence for the entire arrangement. Such determination of the dose can then take place during the irradiation.

In yet another embodiment, use is made of an arrangement in which the signal presented can be advantageously used to stop the irradiation of the arrangement when a maximum radiation dose is reached. This can be realized, for example, by influencing the radiation source itself or by utilizing means which are introduced into the beam path. This aspect will be dealt with in detail in the description of the embodiments.

The claims 10 and 11 disclose an X-ray examination system and an optical image acquisition system, respectively, which are provided with a sensor element arrangement as disclosed above.

The following description, claims and accompanying drawings set forth certain illustrative embodiments applying various principles of the present invention. It is to be appreciated that different embodiments applying principles of the invention may take form in various components, steps and arrangements of components and steps. These described embodiments being indicative of but a few of the various ways in which some or all of the principles of the invention may be employed in a method or apparatus. The drawings are only for the purpose of illustrating an embodiment of an apparatus and method applying principles of the present invention and are not to be construed as limiting the present invention.

BRIEF DESCRIPTION OF THE DRAWINGS

The foregoing and other features and advantages of the present invention will become apparent to those skilled in the art to which the present invention relates upon consideration of the following detailed description of apparatus applying aspects of the present invention with reference to the accompanying drawings, wherein.

DETAILED DESCRIPTION

Figure 1:
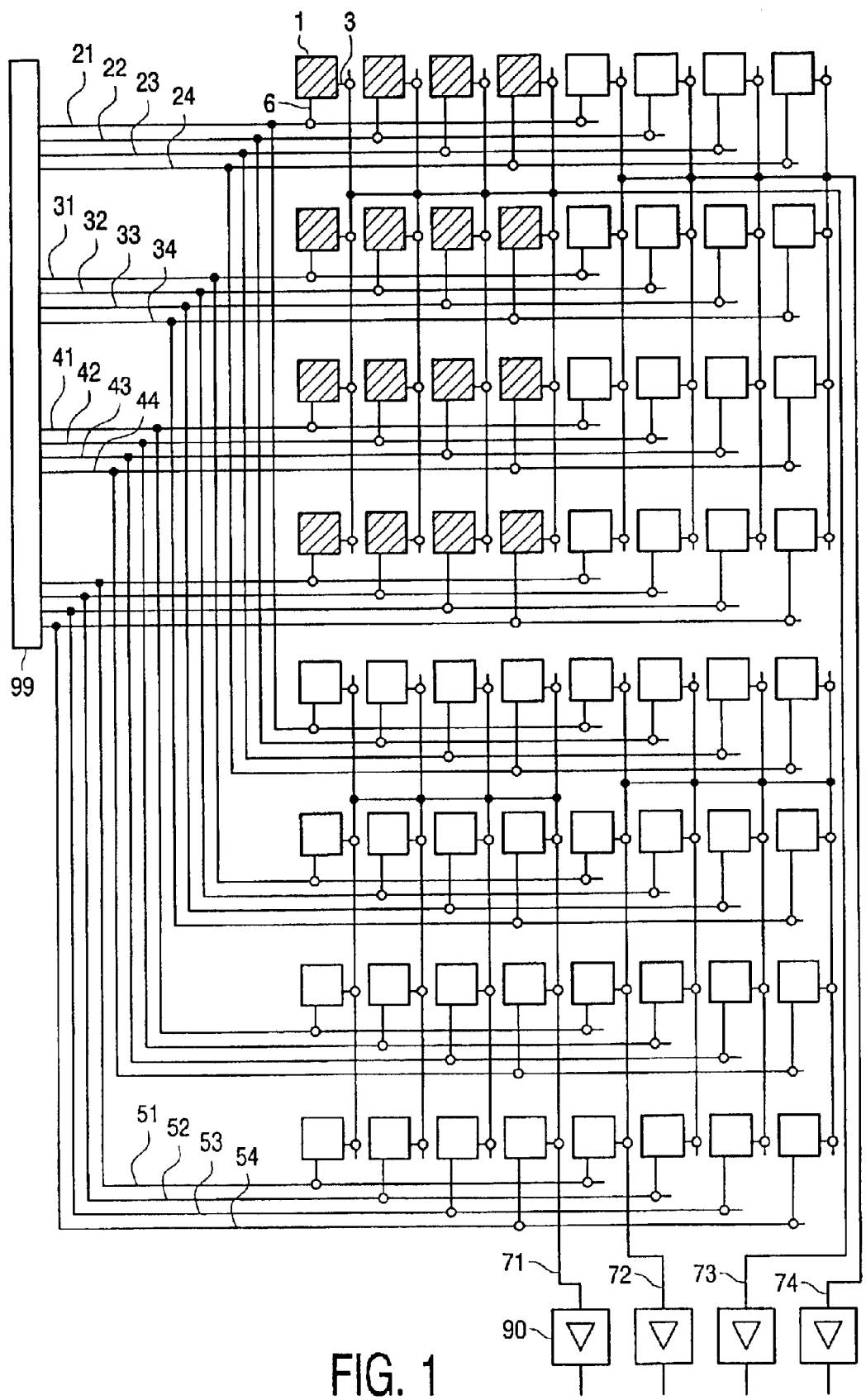
FIG. 1 shows a part of an embodiment of an arrangement in accordance with the invention.

FIG. 1 shows a part of an embodiment of an arrangement of sensor elements in accordance with principles of the invention. The sensor elements 1 are arranged in a matrix of rows and columns. Each sensor element 1 includes a control input 6 via which the sensor element 1 can be activated as well as an output 3 via which the charge signal which arises in the activated state of the sensor of the sensor element 1 can be output. Each time sixteen sensor elements 1, being arranged in a sub-matrix of each time four rows and four columns, form a group; four of such groups are shown in FIG. 1. The sensor elements 1 of one of these groups are represented by shading for the sake of clarity. The outputs 3 of the sensor elements 1 of a group are coupled to a common group read-out lead 71, 72, 73 and 74 and each group read-out lead 71, 72, 73 and 74 is connected to a read-out amplifier such as the amplifier 90. The control input 6 of a control element 1 of a group is connected each time to the control input 6 of a sensor element 1 of another group, that is, via a common control lead 21, 22, 23, 24, 31, 32, . . . , 53, 54 and each common control lead 21, 22, 23, 24, 31, 32, . . . , 53, 54 is coupled to a control unit 99.

When the control unit 99 applies an activation signal individually and sequentially, for example, in the sequence 21, 22, 23, 24, 31, 32, . . . , 53, 54, to the control leads, all sensor elements 1 of a group are successively activated and the charge signals of all sensor elements 1 of a group successively reach the respective read-out amplifier via the respective group read-out lead 71, 72, 73 and 74. The foregoing takes place in all groups simultaneously, so that the groups are read out in parallel. An output image formed therefrom may have the maximum feasible resolution.

An image-forming system often has a need for images which comprise a number of pixels which is smaller than the maximum number that can be produced by the arrangement of sensor elements, that is, images whose resolution is less than the maximum feasible resolution. In the case of maximum resolution each pixel corresponds to the charge signal of a sensor element, whereas in the case of a reduced resolution the number of pixels is smaller than the number of sensor elements. Generally speaking, this reduced resolution is obtained by reading out all sensor elements of the arrangement and by forming a pixel from the combination of the individual charge signals of a plurality of sensor elements in an arithmetic unit (not shown). This method is referred to as binning. When the arrangement consists of, for example, 1000 rows and 1000 columns and a binned image consists of 500 rows and 500 columns, a pixel is formed, for example, from the charge signals of four neighboring sensor elements, that is, each time two sensor elements in the same row and two sensor elements in the same column. Despite the lower image resolution, the amount of data applied to the arithmetic unit by the arrangement remains the same as in the case of maximum resolution of the image. In the arrangement in accordance with the invention, however, direct binning is possible, that is, binning before the signals reach the read-out amplifier. For the same data flow the amount of data thus reduced enables a higher image rate in the case of successive images and at the same time reduces the noise in the combined signal.

The output image should comprise, for example, each time half the number of pixels in the rows and columns in comparison with the number of sensor elements present in the rows and columns in the arrangement. When an activation signal is applied simultaneously to the common control leads 21, 22, 31 and 32 by the control unit 99 in FIG. 1, four directly, multidimensionally neighboring sensor elements 1 are simultaneously activated in each group, the output signals of these sensor elements being superposed on the respective group read-out leads 71, 72, 73 and 74. Thus, a combination signal formed from four output signals is applied to the relevant read-out amplifier; this combination signal represents a binned output signal and can be associated directly with a pixel in the output image. Further pixels are obtained, for example, from the binned signal of the sensor elements which are activated when an activation signal is applied to the control leads 23, 24, 33, 34

41, 42, 51, 52

43, 44, 53, 54.

If the resolution of the image is to be reduced even further, all sixteen sensor elements 1 of a group can be simultaneously activated. The arrangement shown in FIG. 1 thus enables the possibility of two-stage binning. If a group in a larger arrangement is formed by more than sixteen sensor elements, for example, by 1024 elements, that is, 128 elements in each row and each column, multi-stage binning is possible, for example, in such a manner that in a first stage each time four sensor elements in each group are simultaneously activated, that in a second stage each time 16 sensor elements in each group are activated, that in a third stage 64 sensor elements are activated in each group, etc.

Figure 2:
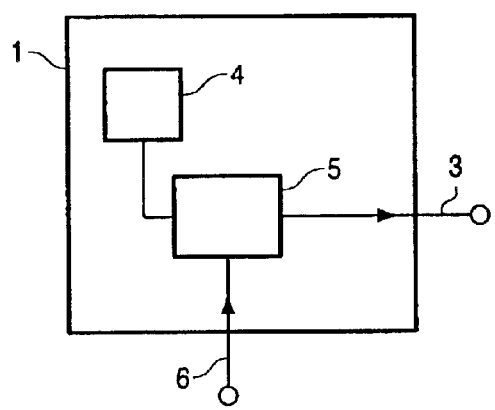
FIG. 2 shows a general sensor element.

In the case of large-area arrangements in accordance with the invention in practice a group is formed by a number of sensor elements which is much larger than that shown in FIG. 2.

Furthermore, an arrangement of sensor elements in accordance with the invention enables dose measurement of the radiation incident on a spatially multidimensional zone. In conformity with FIG. 1 the zone formed by the sensor elements 1 of a group has a two-dimensional and rectangular shape, so that it forms a surface. During the irradiation a charge flow which characterizes the intensity of the radiation flows across each sensor element 1, which charge flow is summed for all sensor elements 1 of a group so as to be applied to the read-out amplifier via the common group read-out lead 71, 72, 73 and 74. In addition to the actual amplification of the read-out signal, the read-out amplifier is also arranged to measure said charge flow. The dose of the radiation incident on the surface of all sensor elements of a group can thus be derived from the charge flow integrated over a given period of time.

The arrangement in accordance with the invention enables the surface formed by the sensor elements of a group to be optimized, that is, in respect of size and shape, for dose measurement. It is also possible to choose a different shape of the surface for one group or for each group, for example, in order to enable separate treatment of the edges of an arrangement in accordance with the invention relative to the central zone thereof. It is also feasible to form the surfaces of the individual sensor elements in groups positioned at the edge of the arrangement so as to be larger than those of sensor elements of a group in the central zone of the arrangement, that is, in the same way as the light sensors in the human eye.

The measurement of the charge flow, as required for the determination of the dose, can be enabled by given characteristics of the switching unit of each sensor element. First of all, FIG. 2 shows a general embodiment of a sensor element 1. The sensor element 1 includes a sensor 4 which produces a charge signal in response to the incidence of electromagnetic radiation, for example, light or X-rays. The sensor element 1 also includes an output 3 via which the charge signal can be output for further processing. In order to enable controlled output of the charge signal, the sensor element 1 includes a switching unit 5 which is arranged to activate the sensor element 1 in response to the arrival of an activation signal on the control input 6. An activated sensor element 1 is characterized in that the sensor 4 is coupled to the output 3.

Figure 3:
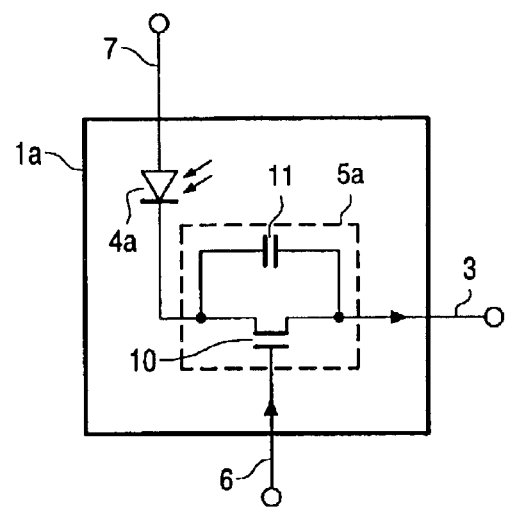
FIG. 3 shows a sensor element provided with a sensor in the form of a photodiode.

FIG. 3 shows a preferred embodiment of a sensor element 1a which can additionally be used for dose measurement. The sensor 4a consists of a photodiode 4a which is fed via a supply input 7 and produces a charge signal in response to the incidence of light, said charge signal being stored in the internal capacitances of the photodiode 4a. The switching unit 5a is realized in the form of a semiconductor switch 10 which has a capacitance 11 connected parallel to the contact beak path. The supply input 7 and the output 3 are taken up in a current circuit via the read-out amplifier which is coupled to the output 3 and is not shown in this case. While the sensor element 1a is not activated, the semiconductor switch 10 is open and the radiation to be detected (being light in the present case) is incident on the photodiode 4a. The building up of the charge signal in the internal capacitances of the photodiode 4a gives rise to a charge flow which can flow from the photodiode 4a, via the capacitances 11, to the output 3 and on to the read-out amplifier which is not shown. The dose incident on the photodiode 4a can be determined from the amount of charge flow, that is, also during an irradiation. For the measurement of the actual charge signal the sensor element 1a is activated in a next step by application of an activation signal to the control input 6, the semiconductor switch 10 then being closed so that the photodiode 4a is coupled to the output 3. The charge signal then present at the photodiode 4a can flow practically completely to the read-out amplifier. The subsequent opening of the semiconductor switch 10 deactivates the sensor element 1a again so that it is ready for a further measurement. When X-rays are to be detected by means of such a sensor element 1a, a so-called scintillator is provided in front of the photodiode 4a, which scintillator is arranged to emit light in response to the incidence of X-rays.

Figure 4:
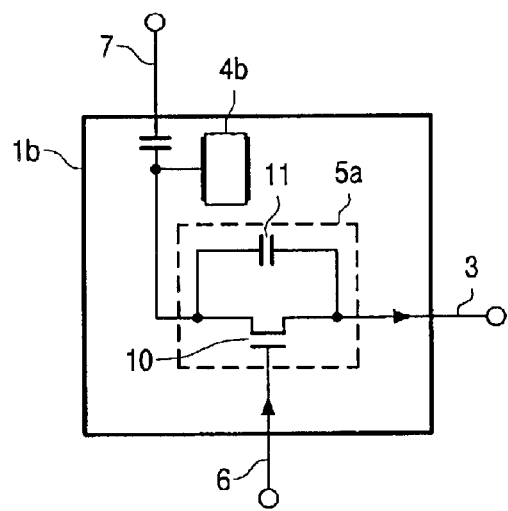
FIG. 4 shows a directly converting sensor element.

FIG. 4 shows a further preferred embodiment of a sensor element 1b which is suitable for use in the arrangement in accordance with the invention. As opposed to the embodiment just described, the sensor is a directly converting type and is formed by a layer 4b between two electrodes, the layer material being arranged to change a voltage present on the electrodes in response to the incidence of X-rays. The layer material may consist of, for example, amorphous selenium, lead iodide, lead oxide or mercury iodide. The changing of the voltage causes a charge flow across the capacitance 11 which is connected parallel to the semiconductor switch 10. The dose of the radiation and the charge signal of the sensor 4b can be determined and read out, respectively, by means of the methods and means described above with reference to FIG. 3. The connection of the second electrode of the sensor 4b, generally being conceived as a common electrode for all sensors of the arrangement, is not shown in this case.

Figure 5:
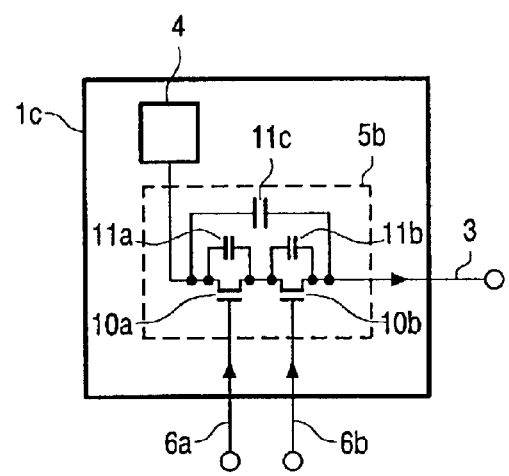
FIG. 5 shows a sensor element provided with two control inputs.

FIG. 5 shows an embodiment of a sensor element which includes more than one control input. The switching unit 5b of a sensor element 1c has two series connected switches 10a and 10b, the switching inputs of the switches 10a and 10b constituting a first control input 6a and a second control input 6b of the sensor element 1c. A respective capacitance 11a, 11b is connected parallel to each of the switches 10a and 10b. A further, optional capacitance 11c, connected parallel to the entire contact break path of the switching unit 5b, demonstrates, by way of example, the manifold structural possibilities for optimum adaptation to a signal processing system. The previously described dose measurement can be performed in the same way as described above by means of the capacitances 11a, 11b and 11c. By providing two control inputs 6a and 6b for each sensor element, the activation patterns may be definitely more complex than when the sensor elements are provided with one control input only. The advantage thus obtained becomes apparent when the number of control leads for each group is considered. To this end, the following assumptions are made by way of example: two different signals, "0" and "1", can be applied to a control input. When a sensor element has one control input, it is assumed to be activated when the signal "1" is present on this control input; when a sensor element includes two control inputs, it is assumed to be activated when the signal "1" is simultaneously present on both control inputs. Subject to these assumptions, it is necessary (as illustrated in FIG. 1) to provide a respective control lead for each sensor element in the case of an arrangement involves each time one control input for each sensor element of a group. The number of control leads whereto the sensor elements of a group are coupled is equal to the number of the sensor elements thereof. However, when each of the sensor elements includes two control inputs, suitable coupling of the control inputs to the control leads enables a substantial reduction of the total number of control leads to be fed to a group. The number of sensor elements in each group is assumed to be N and the number of control leads to be fed to the group is assumed to be L. In the case of one control input for each sensor element, L=N control leads are required for each group; in the case of two control inputs for each sensor element, each group requires at least $L=2.\sqrt{N}$ control leads, where L is to be rounded off to a next-higher integer number. The larger the number of sensor elements in each group, the more pronounced this effect will be.

The sensor elements which are shown by way of example in the FIGS. 2 to 5 can be manufactured by means of known technologies, for example, by means of the thin-film technique with transistors and possibly photodiodes of amorphous silicon. The elements which are additionally required in accordance with the invention in order to enable the charge flow can also be realized by means of said thin-film technique.

Figure 6:
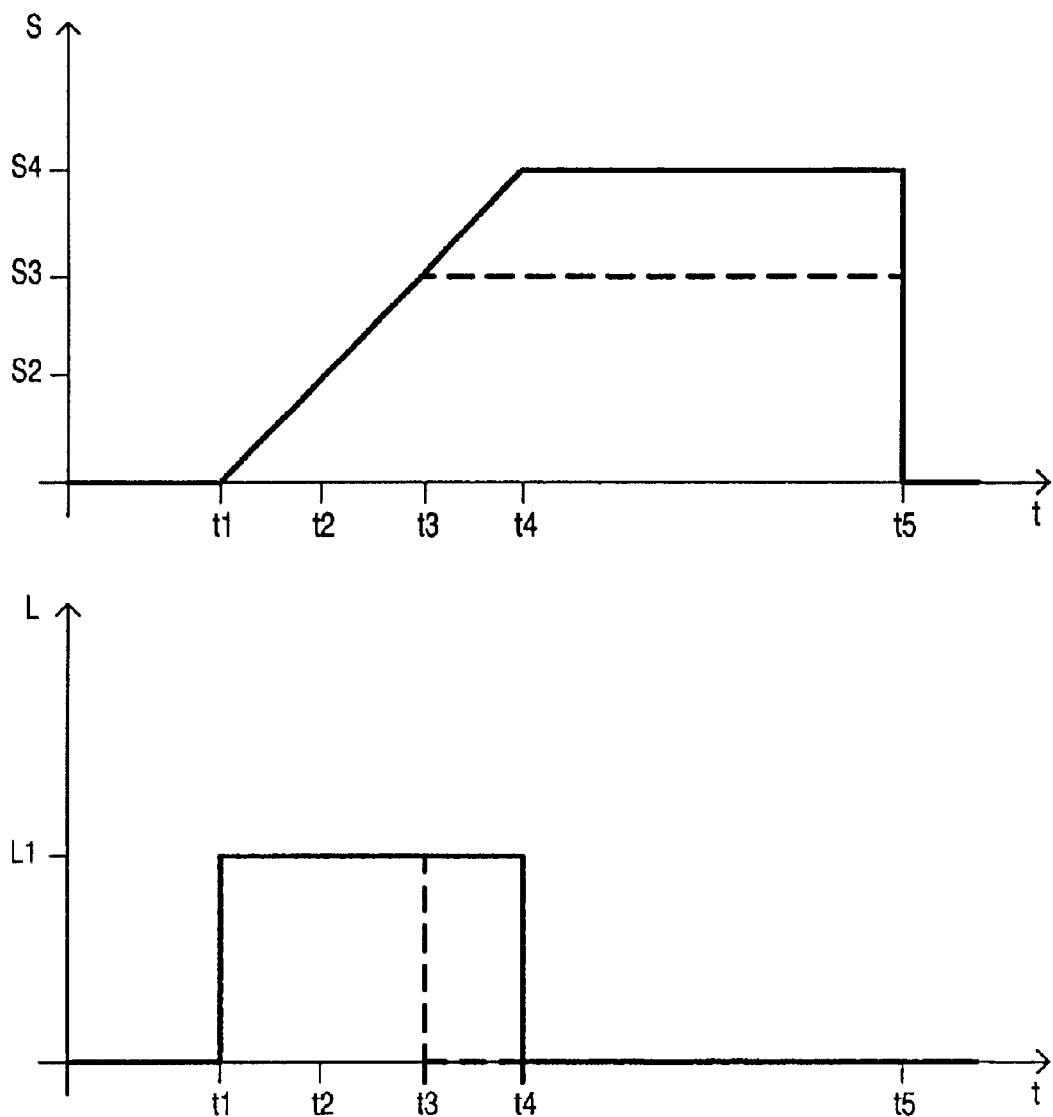
FIG. 6 shows two diagrams illustrating the variation in time of the charge signal and the charge flow.

FIG. 6 shows a diagram in which the variation in time of the charge signal and the charge flow in a sensor element are shown by way of example. The vertical axis in the upper diagram represents the level of the charge signal S whereas the vertical axis in the lower diagram represents the level of the charge flow L and the horizontal axes represent the time t. Until an instant t1 no charge signal is present in the sensor and the sensor element is not exposed to radiation. First the solid curves will be considered. As from the instant t1 the sensor element is exposed to radiation whose intensity is approximately constant in the further course of the exposure, so that the charge signal increases approximately linearly. At an instant t4 the charge signal reaches the value S4 and the irradiation is terminated. At an instant t5 the sensor element is activated and the charge signal can be output by the sensor element for further processing. While the charge signal increases in the time interval between t1 and t4, an approximately constant charge flow L1 is enabled via the corresponding means of the switching unit, which charge flux is shown in the lower diagram.

The dose can be determined from the amount of charge flow. If the quantity of charge having flown thus far is determined at further instants t2 and t3 during the radiation, the dose which has already been incident on the sensor element can be determined already during the irradiation. If it is necessary to ensure that a given dose is not exceeded, and such a maximum permissible dose is already reached at the instant t3, the foregoing information can be used to terminate the irradiation by way of an alarm signal which indicates that said dose is exceeded and is applied, for example, to an X-ray source. The dashed curves are then obtained in the upper as well as in the lower diagram. A further method of evaluating the dose during the irradiation consists in determining the charge flow at regular time intervals and to predict, on the basis of suitable algorithms, the instant at which the maximum permissible dose will be reached. The irradiation is then stopped at that instant.

The invention is of course not limited to the described or shown embodiments, but generally extends to any embodiment, which falls within the scope of the appended claims as seen in light of the forgoing description and drawings. While a particular feature of the invention may have been described above with respect to only one of the illustrated embodiments, such features may be combined with one or more other features of other embodiments, as may be desired and advantageous for any given particular application. From the above description of the invention, those skilled in the art will perceive improvements, changes and modification. Such improvements, changes and modification within the skill of the art are intended to be covered by the appended claims.

Having described a preferred embodiment of the invention, the following is claimed:

1. An apparatus having an arrangement of sensor elements comprising:

at least two sensor elements, each including at least one sensor, at least one output, at least one control input and at least one switching unit, in which at least one of the sensor elements can be activated so that a signal generated by the sensor is present on the output in the activated state, the switching unit is coupled to the sensor, to the output and to the control input and is arranged to compare a signal pattern present on the control input with at least one activation pattern and to activate at least one of the sensor elements in the case of correspondence between the signal pattern present and the activation pattern, wherein each sensor element includes at least one means which is arranged to enable a charge flow between the sensor and the output in the non-activated state of the sensor element, the arrangement including at least two groups of sensor elements configured in such a manner that at least one output of each of these sensor elements is coupled to a group output, and in which three sensor elements in at least one group span a geometrical plane.

2. The apparatus of claim 1 wherein a means of at least one of the sensor elements is at least one capacitance and/or parasitic capacitance of one or more semiconductor switches.

3. The apparatus of claim 1 wherein the sensor elements of a group form a coherent geometrical zone which comprises exclusively sensor elements of this group.

4. The apparatus of claim 1 wherein the control inputs of some or all sensor elements of different groups are coupled.

5. The apparatus of claim 1 wherein the control inputs of some or all sensor elements are coupled to at least one control unit which is arranged to activate the sensor elements in such a manner that at option none, one or several of the sensor elements are activated at a given instant during the reading out of the arrangement.

6. The apparatus of claim 1 wherein the group output is coupled to at least one read-out amplifier.

7. The apparatus of claim 6 wherein the read-out amplifier is additionally arranged to determine the charge flow over a given period of time.

8. The apparatus of claim 1 wherein the arrangement includes a monitoring unit which is arranged to determine the dose incident on the entire arrangement, or parts of the arrangement, during an irradiation and to supply an alarm signal when a given dose is reached.

9. An X-ray examination system comprising;
an x-ray source;
an x-ray detector in operative relationship with the x-ray source, the detector comprising at least two sensor elements, each including at least one sensor, at least one output, at least one control input and at least one switching unit, in which at least one of the sensor elements can be activated so that a signal generated by the sensor is present on the output in the activated state, the switching unit is coupled to the sensor, to the output and to the control input and is arranged to compare a signal pattern present on the control input with at least one activation pattern and to activate at least one of the sensor elements in the case of correspondence between the signal pattern present and the activation pattern, wherein the sensor elements include at least one means which is arranged to enable a charge flow between the sensor and the output in the non-activated state of the sensor elements, the arrangement including at least two groups of sensor elements configured in such a manner that at least one output of each of these sensor elements is coupled to a group output, and in which three sensor elements in at least one group span a geometrical plane.

10. An optical image acquisition system comprising at least two sensor elements, each including at least one sensor, at least one output, at least one control input and at least one switching unit, in which each sensor element can be activated so that a signal generated by the sensor is present on the output in the activated state, the switching unit is coupled to the sensor, to the output and to the control input and is arranged to compare a signal pattern present on the control input with at least one activation pattern and to activate at least one of the sensor elements in the case of correspondence between the signal pattern present and the activation pattern, wherein each sensor element includes at least one means which is arranged to enable a charge flow between the sensor and the output in the non-activated state of the sensor element, the arrangement including at least one group of sensor elements which is configured in such a manner that at least one output of each of these sensor elements is coupled to a group output, and in which three sensor elements in at least one group span a geometrical plane.

11. An arrangement of sensor elements comprising:

at least two sensor elements including at least one sensor, at least one output, at least one control input and at least one switching unit, in which at least one of the sensor elements can be activated so that a signal generated by the sensor is present on the output in the activated state, in which the switching unit is coupled to the sensor, to the output and to the control input and is arranged to compare a signal pattern present on the control input with at least one activation pattern and to activate the sensor element in the case of correspondence between the signal pattern present and the activation pattern, in which the sensor element includes at least one means which is arranged to enable a charge flow between the sensor and the output in the non-activated state of the sensor element, in which the arrangement includes at least one group of sensor elements which is configured in such a manner that at least one output of each of these sensor elements is coupled to a group output, and in which three sensor elements in at least one group span a geometrical plane.

12. An arrangement as claimed in claim 11, characterized in that a means of at least one of the sensor elements is at least one capacitance and/or parasitic capacitance of one or more semiconductor switches.

13. An arrangement as claimed in claim 11, characterized in that the sensor elements of a group form a coherent geometrical zone which comprises exclusively sensor elements of this group.

14. An arrangement as claimed in claim 11, characterized in that the control inputs of some or all sensor elements of different groups are coupled.

15. An arrangement as claimed in claim 11, characterized in that the control inputs of some or all sensor elements are coupled to at least one control unit which is arranged to activate the sensor elements in such a manner that at option none, one or several of the sensor elements are activated at a given instant during the reading out of the arrangement.

16. An arrangement as claimed in claim 11, characterized in that the group output is coupled to at least one read-out amplifier.

17. An arrangement as claimed in claim 16, characterized in that the read-out amplifier is additionally arranged to determine the charge flow over a given period of time.

18. An arrangement as claimed in claim 11, characterized in that the arrangement includes a monitoring unit which is arranged to determine the dose incident on the entire arrangement, or parts of the arrangement, during an irradiation and to supply an alarm signal when a given dose is reached.

19. An arrangement as claimed in claim 11 including an X-ray in operative relationship with the at least one sensor element.

20. An arrangement as claimed in claim 11 adapted for optical image acquisition.

* * * * *